United States Patent Office 3,447,738
Patented June 3, 1969

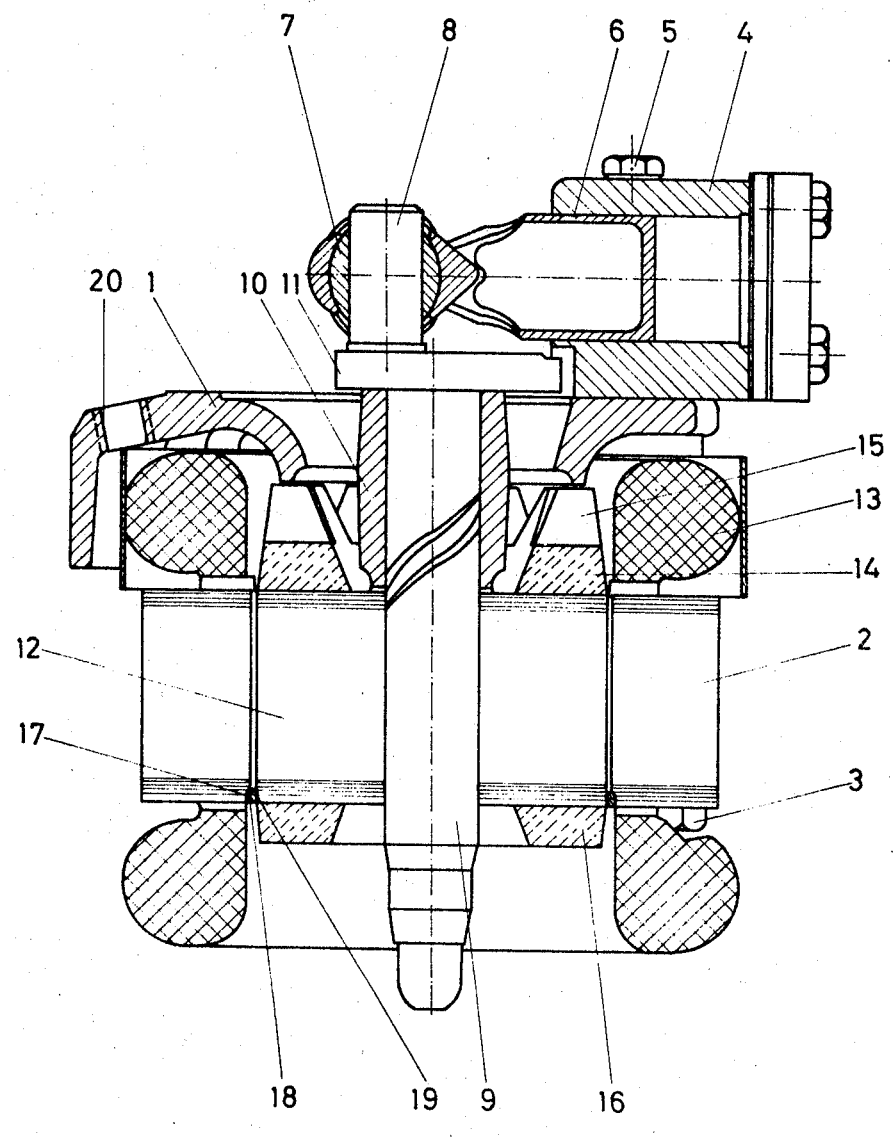

3,447,738
BEARING ARRANGEMENT FOR MOTOR-COMPRESSOR ASSEMBLIES AND THE LIKE
Knud Vagn Valbjorn, Augustenhof, Nordborg, Denmark
Filed Aug. 11, 1967, Ser. No. 659,936
Int. Cl. F04b 35/04
U.S. Cl. 230—58                                 5 Claims

ABSTRACT OF THE DISCLOSURE

The invention relates to a bearing arrangement for a motor-compressor assembly of the type used for small refrigerating units. In prior art constructions there are provided, between the rotor shaft and the housing, either a relatively long main bearing or two shorter bearings at opposite ends of the shaft. In this invention a relatively short main bearing is provided in the housing for the rotor shaft, between the rotor and the compressor, and a second ring bearing is provided at the opposite end of the assembly between the rotor and the stator. The ring bearing between the stator and the rotor is made of a material of low magentic and electric conductivity such as aluminum or a synthetic material such as polytetrafluoroethylene.

---

The invention relates to a motor-compressor, especially for small refrigerating units in which the motor shaft is supported between the crank pin and the rotor in a main bearing.

Known motor-compressors of this type have only a single bearing which is provided in a motor support element fitted to one end of the stator. A bearing of this kind must be very long to absorb the flexural stress produced by the heavy rotor and the non-symmetrical loading of the piston. In such an assembly the main bearing must be partially taken through the rotor, and a suitable recess provided for this purpose in the rotor. Problems arise in the manufacture of such long bearings and of recessed rotors. Besides, the recess impairs the electrical quality of the motor. Moreover, after a certain period of operation, the main bearing shows signs of wear at the end facing the motor, and the air gap does not remain constant.

It is also known to provide a motor-compressor supported by two bearings. These bearings may be considerably shorter. However, a more complex housing is needed to accommodate the two bearings. Also, assembly proves more difficult.

The present invention has for its object to provide a motor-compressor with one main bearing which is less subject to wear and may be kept shorter.

The invention is characterized in that a small bearing surface for the rotor is provided on the stator pack at the motor end not adjacent the main bearing. In particular, an annular bearing may be inserted in the stator pack which cooperates with the ground circumference of the rotor.

Such additional support means eliminates the flexural stress placed upon the shaft by the rotor. It is provided at a point where the forces to be absorbed are very small. The additional technical means required for this purpose are negligible, since one of the bearing surfaces is formed by a ground surface already available, whereas the other bearing surface is presented by a narrow ring which may be thin because it is supported by the stator. If the rotor rotates within such a ring with a clearance of approximately 30 microns, there will be no appreciable mechanical, electrical or magnetic losses.

Obviously it would also be possible to provide a construction in which a portion of the ground inner circumference of the stator cooperates with a ring bearing on the rotor. The latter need not bear directly on the stator: it may, for example, be constituted by the short-circuit ring, which has a certain rigidity. In an advantageous solution the ring bearing is integral with the short-circuit ring.

The ring bearing should consist of a material of very low magnetic and electric conductivity. A suitable metal is aluminium. Synthetic materials are also eligible, for example polytetrafluoroethylene.

Very narrow ring bearings will be sufficient. Their width may be below 5 mm., and preferably below 3 mm. It would also be possible to do without rings and to provide the bearing surface merely in the form of several projections on the rotor circumference or the inner stator circumference.

In further development of the invention it is suggested to let the main bearing terminate outside the rotor. A construction of this type is quite justifiable when the addition bearing of the invention is employed.

The invention will now be described in further detail with reference to an embodiment thereof illustrated in the accompanying drawing. This drawing shows a longitudinal section of a motor-compressor for a small refrigerating unit of the kind usually employed within the housing of an hermetically enclosed system.

The stator pack 2 is fastened to a motor support element 1 by means of screws 3, and a cylinder 4 is fastened thereto by means of screws 5. A piston 6 executes a reciprocating movement within the cylinder and is driven by a pin 8 on a shaft 9 by means of a crank guide 7. This shaft is supported in a main bearing 10 of the support element 1 and carries a balancing weight 11 on one side of the bearing 10, and the rotor laminations 12 on the other side thereof. The rotor winding 14 which cooperates with the stator winding 13 is injection-moulded from aluminium and is provided at the upper end with fans 15 and at the lower end with a short-circuit ring 16.

At the low end the inner stator circumference has a small recess 17 into which is forced an aluminium ring 18. The latter has a cross section of 2 mm. x 2 mm. This ring cooperates with a narrow portion 19 of the ground outer circumference of the rotor pack 12. This additional guide means considerably relieves the main bearing 10 from transversely acting forces, the result being that the main bearing may terminate outside the rotor 12.

A motor-compressor of this type may be suspended in a housing provided in a refrigerating unit by means of spirngs engaging the apertures 20.

I claim:
1. An electric motor and compressor assembly comprising a support member having a main bearing portion with inboard and outboard ends, a shaft journalled in said bearing portion, a rotor having a rotor pack, said rotor pack being attached to said shaft immediately adjacent said inboard end of said bearing portion, a stator attached to said support member, said stator having a stator pack and windings extending from the opposite ends of said stator pack, said support member having a generally radially extending flange portion immediately adjacent one end of said stator windings, said flange portion having a radially extending planar surface in substantial axial alignment with said outboard end of said bearing, a cylinder casing for said compressor, said casing being attached to said flange portion in abutting engagement with said planar surface, and bearing means between said rotor pack and said stator pack at the ends thereof opposite from said main bearing.

2. An assembly according to claim 1 wherein said rotor pack has a ground circumferential surface and said bearing means comprises an annularly shaped ring bearing attached to said stator pack.

3. An assembly according to claim 1 wherein said rotor pack and said stator pack are cooperating members with one of said members having a ground circumferential surface and said bearing means comprises an annularly shaped ring bearing attached to the other of said members.

4. An assembly according to claim 1 wherein said bearing means consists of aluminum.

5. An assembly according to claim 3 wherein the width of said ring bearing is on the order of 3 to 5 millimeters.

References Cited

UNITED STATES PATENTS 2,236,088  3/1941  Doeg _____ 230—58
2,781,464  2/1957  Timms _____ 310—90
3,191,079  6/1965  Gitzendanner ____ 310—90 XR

FOREIGN PATENTS 717,205  2/1942  Germany.

ROBERT M. WALKER, *Primary Examiner.*

U.S. Cl. X.R.

310—90